(12) United States Patent
Popp

(10) Patent No.: US 7,886,774 B1
(45) Date of Patent: Feb. 15, 2011

(54) CORRUGATED FOUNDATION DRAIN

(76) Inventor: Dick Popp, 300 N. Lilas Dr., Appleton, WI (US) 54914

(*) Notice: Subject to any disclaimer, the term of this patent is extended or adjusted under 35 U.S.C. 154(b) by 0 days.

(21) Appl. No.: 12/462,089

(22) Filed: Jul. 28, 2009

Related U.S. Application Data

(60) Provisional application No. 61/084,132, filed on Jul. 28, 2008.

(51) Int. Cl.
*F16L 11/00* (2006.01)
(52) U.S. Cl. .................... 138/121; 138/118; 138/119; 138/120
(58) Field of Classification Search ............... 138/109, 138/121, 118, 119, 155, 120; 285/226, 903
See application file for complete search history.

(56) References Cited

U.S. PATENT DOCUMENTS

| | | | |
|---|---|---|---|
| 3,578,777 A * | 5/1971 | DeGain | 138/121 |
| 4,865,362 A * | 9/1989 | Holden | 285/260 |
| 5,120,162 A | 6/1992 | Parker | |
| 5,224,799 A | 7/1993 | Parker | |
| 5,466,092 A | 11/1995 | Semenza et al. | |
| 5,474,400 A | 12/1995 | Kliefoth et al. | |
| 6,223,777 B1 * | 5/2001 | Smith et al. | 138/109 |
| D443,344 S * | 6/2001 | Evans | D23/266 |
| 7,017,614 B2 * | 3/2006 | Handley | 138/109 |
| 2009/0000682 A1 * | 1/2009 | Kisu et al. | 138/121 |

* cited by examiner

*Primary Examiner*—Patrick F Brinson
(74) *Attorney, Agent, or Firm*—Brannen Law Office, LLC

(57) ABSTRACT

The present invention relates to a corrugated foundation drain. The drain is comprised of a plurality of segments attached in an end to end fashion. Each segment has a first end and a second end, wherein the second end of one segment can be attached to the first end of an adjacent segment. The drain is corrugated. The drain has sections of corrugations separated by spacers for longitudinal stability. A web is provided within the interior of the drain segments. The web can be vertically centered. In the preferred embodiment, the web can be removed from the first end to provide clearance for receipt of the second end. The second end further can have cleats that interface with the corrugations in the first end.

18 Claims, 10 Drawing Sheets

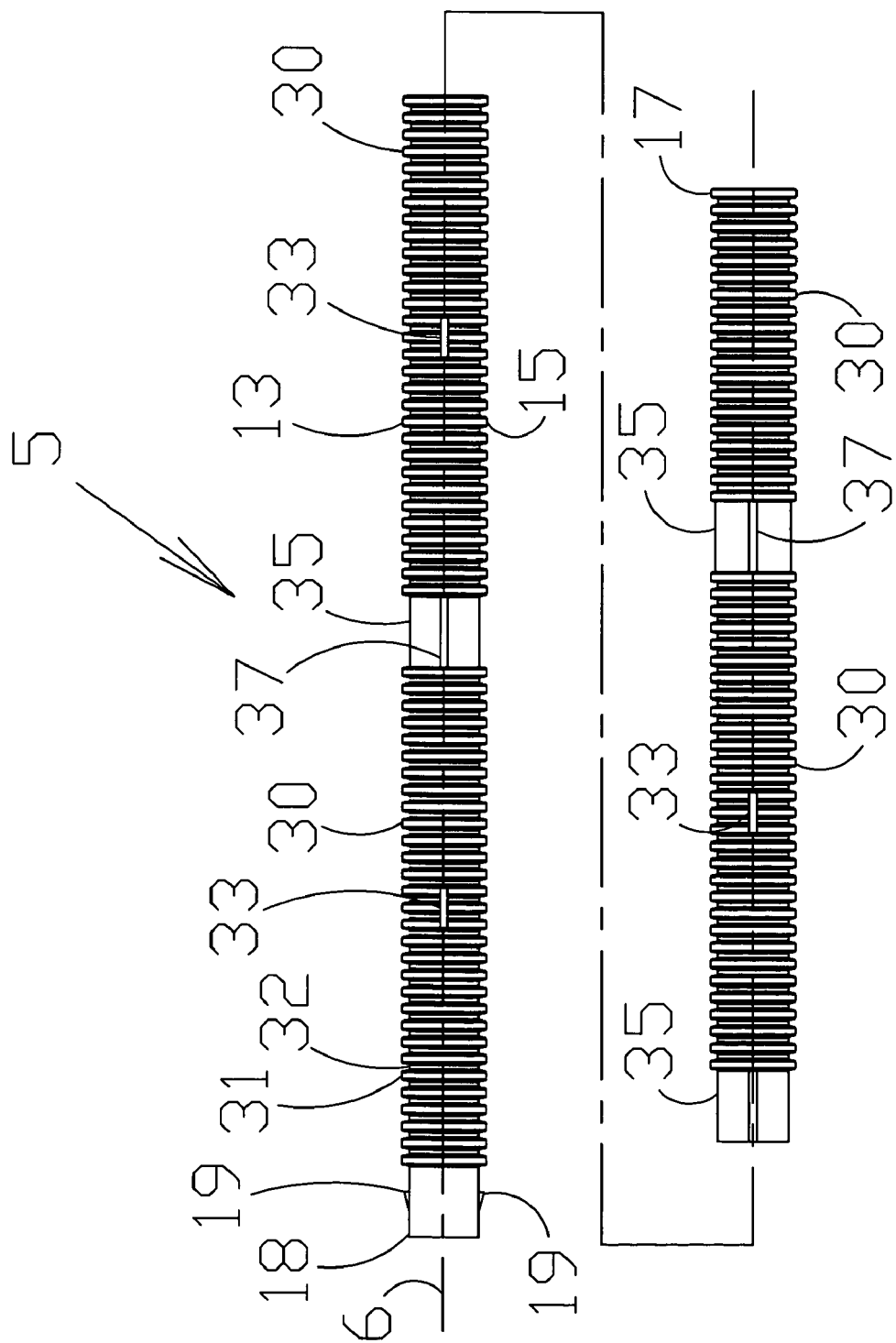

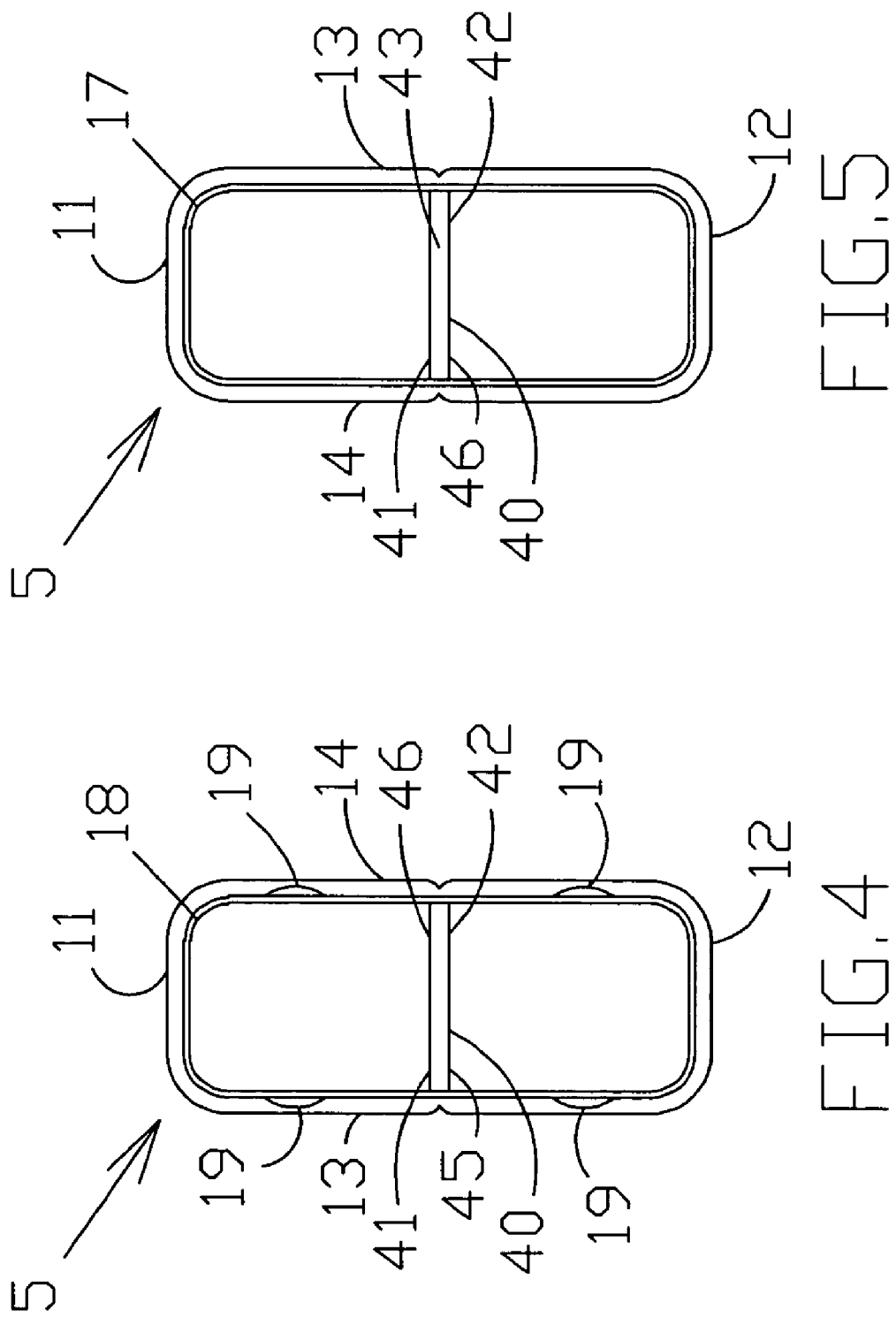

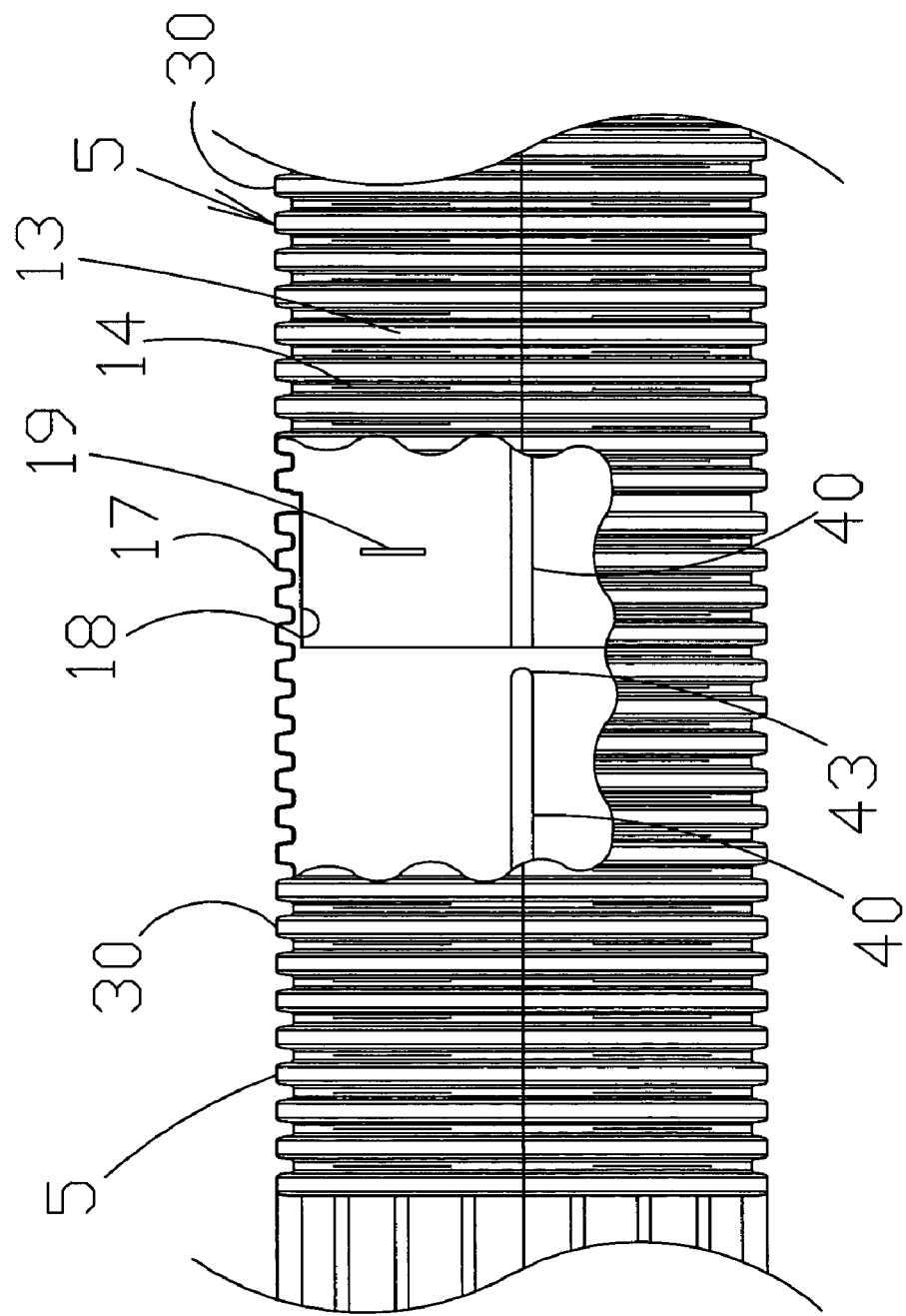

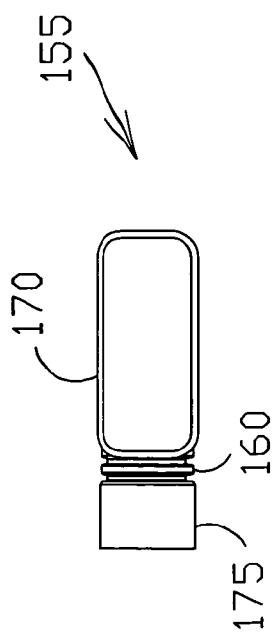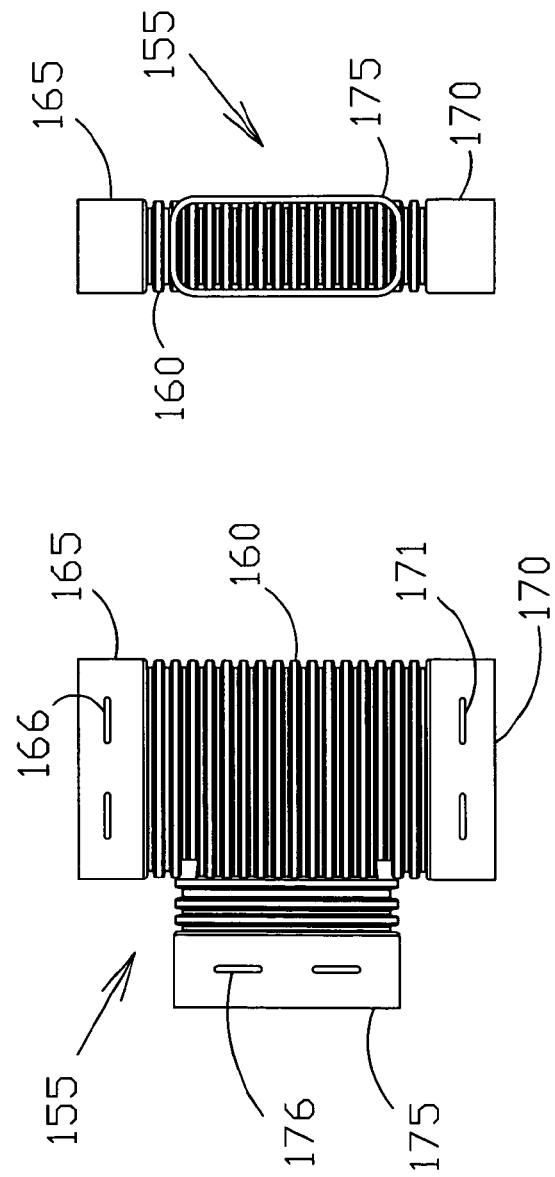

CORRUGATED FOUNDATION DRAIN

This United States utility patent application claims priority on and the benefit of provisional application 61/084,132 filed Jul. 28, 2008, the entire contents of which are hereby incorporated herein by reference.

BACKGROUND OF THE INVENTION

1. Field of the Invention

The present invention relates to a corrugated foundation drain and in particular to a drain having at least one of the following characteristics: being polygonal with a corrugated top, having a central membrane, having holes on multiple sides and/or being modular and self-coupling.

2. Description of the Related Art

The utility of drainage systems is unquestioned. Many people have designed and constructed drainage systems used to collect and disburse water from the base of a structure. Some examples are provided below.

U.S. Pat. No. (hereafter "USPN") 5,120,162 to Parker is titled Building Foundation Form with Integral Drain. The patent discloses that a concrete footing/foundation retainment co-features integral (unitary) drainage means. In one embodiment, a form similar to an ordinary plank but featuring a hollow core which communicates through a multiplicity of foramens (holes) with only one face of the plank. The other sides of the plank are taught to be smooth and generally unrelieved. In a second embodiment, only one face is smooth and the others are described to not have a specific geometric definition.

U.S. Pat. No. 5,224,799 also to Parker is titled Permanently Installed Building Foundation Form, and is a continuation-in-part of U.S. Pat. No. 5,120,162. This patent discloses a bracket means of a castellated shape.

U.S. Pat. No. 5,474,400 to Kliefoth et al. is titled Radon Remediation in Form-Drain Apparatus. This patent discloses the use of an evacuation means to create an exhaust draft.

U.S. Pat. No. 5,466,092 to Semenza et at. is titled Form-Drain Filter. This patent discloses a form-drain filter for blocking the entry of fine particulate into a drain and/or sump system. The filter is described to consist of a fine particulate filter fabric of mesh small enough to sieve from subterranean waters all particulate capable of clogging a drain network. A water-impervious adhesive is used to bind the fabric to portions of siliceous footings.

None of these patents disclose a corrugated form.
None of these patents disclose an internal membrane.
None of these patents disclose a form with holes or perforations on more than one side of the form.
None of these patents disclose modular self coupling forms.
None of these patents disclose spacers for longitudinal rigidity to prevent bowing of the form.

Thus there exists a need for a corrugated foundation drain that solves these and other problems.

SUMMARY OF THE INVENTION

The present invention relates to a corrugated foundation drain. The drain is comprised of a plurality of segments attached in an end to end fashion. Each segment has a first end and a second end, wherein the second end of one segment can be attached to the first end of an adjacent segment. The drain is corrugated. The drain has sections of corrugations separated by spacers or spacer segments for longitudinal stability. A web is provided within the interior of the drain segments. The web can be vertically centered within the interior. In the preferred embodiment, the web can be removed from the first end to provide clearance for receipt of the second end. The second end further can have cleats that interface with the corrugations in the first end. It is appreciated that the first end can be cut at any desired length along the longitudinal axis of the drain segment.

According to one advantage of the present invention, the drain is a corrugated drain. In this regard, the drain is able to provide a large degree of structural strength.

According to another advantage of the present invention, the drain can have an internal membrane. The membrane advantageously provides side to side support to each segment of the drain to prevent bowing of the drain.

According to a further advantage of the present invention, each segment of the drain can have hole or perforations on multiple sides, and perhaps even on all sides. In this regard, the drain segments retain utility without strict adherence to having a single face that faces outward of the structural base (typically concrete).

According a still further yet advantage of the present invention, each segment of the drain is modular and self coupling. This is accomplished in the present invention by having the second end be received within the first end of an adjacent segment. The second end can have a flat portion with cleats that can interface with or snap into the corrugations of the first end of the adjacent segment. In this regard, the second end can also be referred to as a coupling end.

According a still further yet advantage of the present invention, each section has one or more spacers in between segments of corrugation. The spacers provide longitudinal support to prevent bowing of the drain. The spacers can have horizontal supports along the sides of the spacer segments, which provide support to prevent bending or bowing of the drain segments.

Also, several vertical supports can be incorporated along the top and bottom of the drain segment, both within corrugation segments and within spacer segments, to also provide structural rigidity.

According to a still further advantage yet of the present invention, several braces may be utilized to maintain spacing between two parallel segments. The braces (not shown) can have several shapes, and can be securely positioned within a selected valley between two crowns in the opposed segments to provide spacing, not interfere with a striking surface, and maintain longitudinal spacing.

Several components, in addition to longitudinal segments, can also be provided. For example, coupler segments, elbow segments and T-shaped segments can also be provided with this modular system.

Other advantages, benefits, and features of the present invention will become apparent to those skilled in the art upon reading the detailed description of the invention and studying the drawings.

BRIEF DESCRIPTION OF THE DRAWINGS

FIG. 3 is a top view of the preferred embodiment illustrated in FIG. 2.

FIG. 4 is an end view of the second end of the preferred embodiment illustrated in FIG. 2.

FIG. 5 is an end view of the first end of the preferred embodiment illustrated in FIG. 2

FIG. 6 is a side view of two drain segments in an interlocking engagement.

FIG. 11 is a side view of a T-section.

FIG. 12 is an end view of the T-section shown in FIG. 11.

FIG. 13 is a top view of the T-section shown in FIG. 11.

DETAILED DESCRIPTION OF THE PREFERRED EMBODIMENTS

Figure 1:
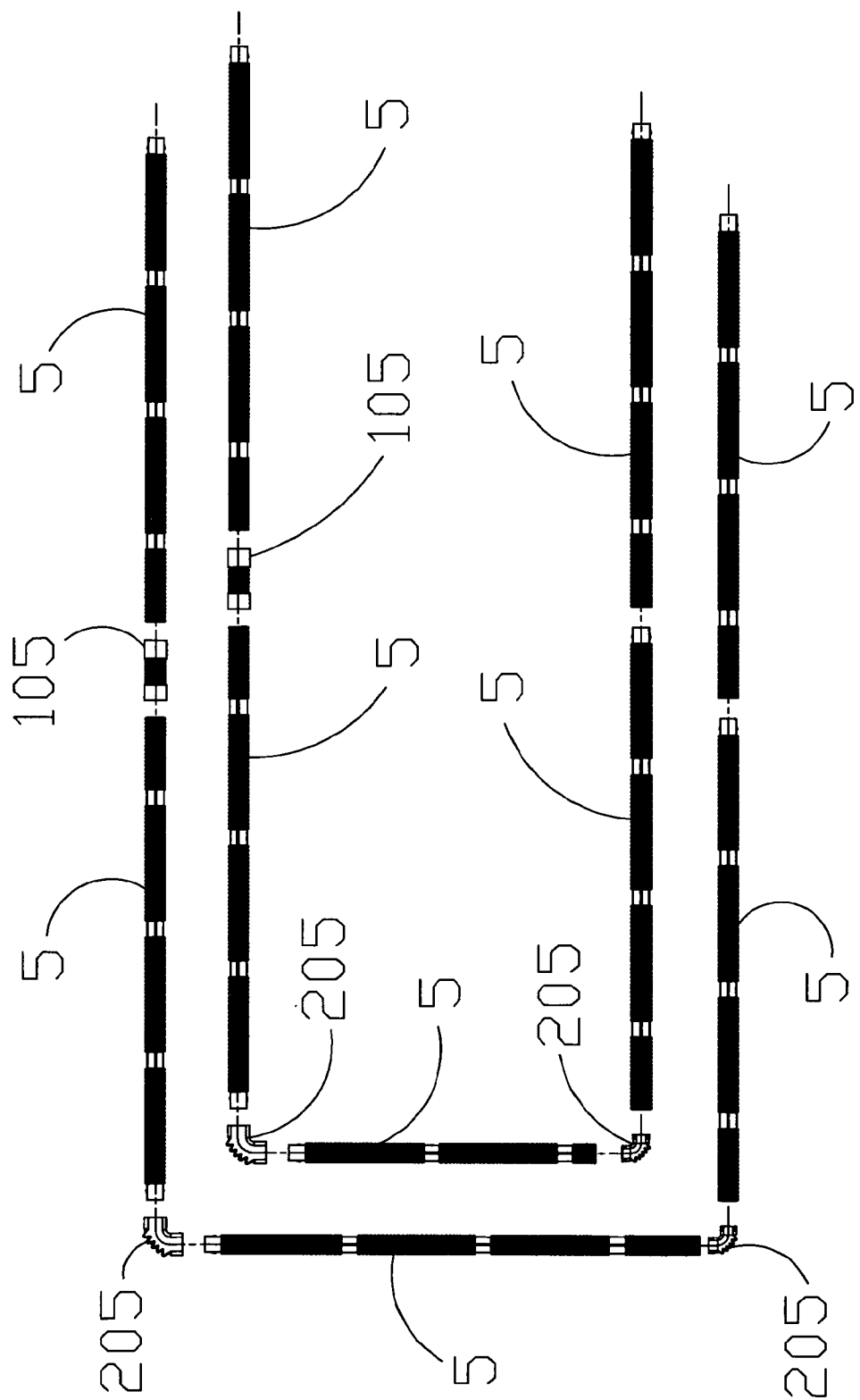
FIG. 1 is a top exploded view of several segments of the present invention.
Figure 2:
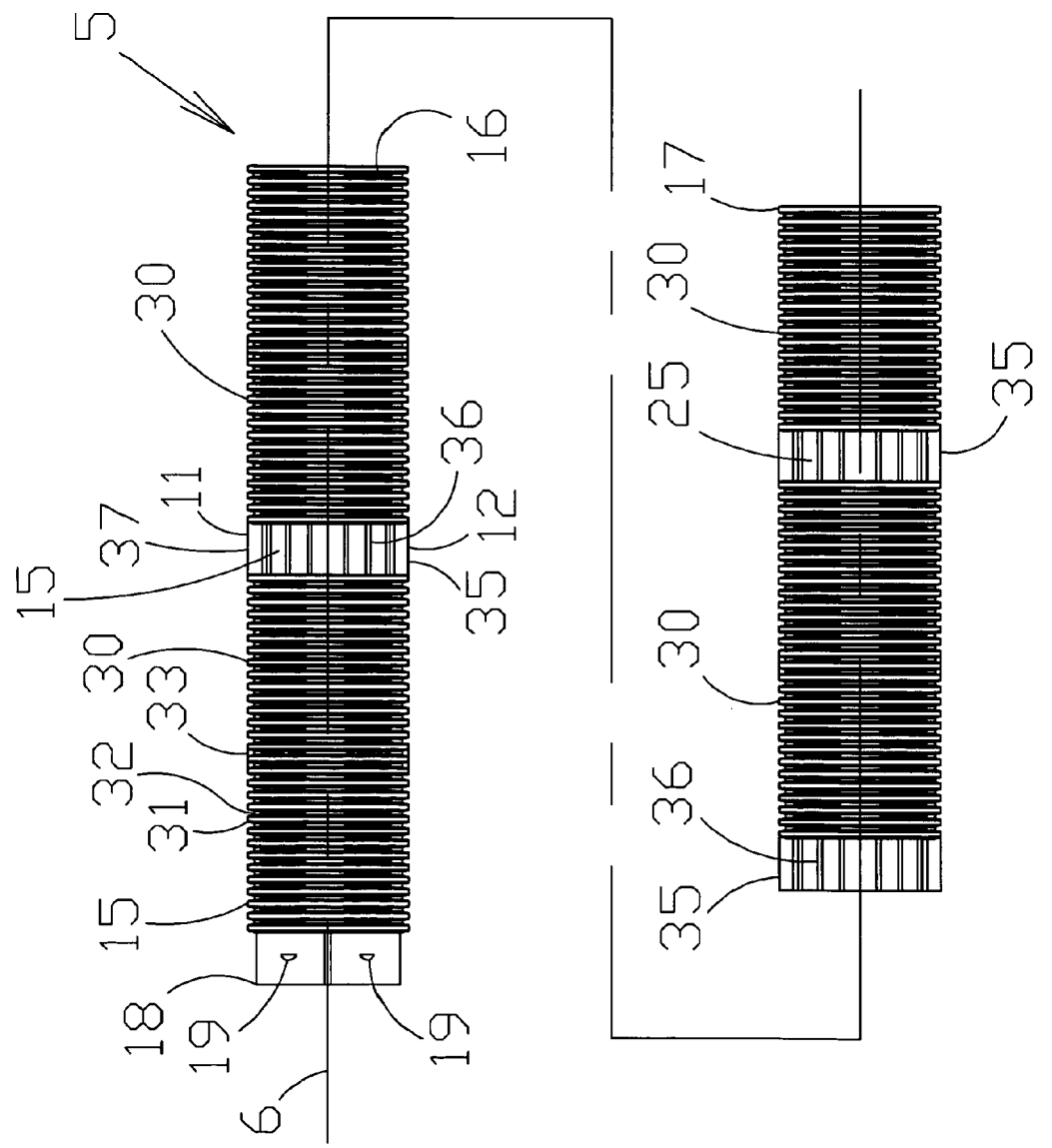
FIG. 2 is a side view of a preferred embodiment of the drain segment of the present invention.
Figure 7:
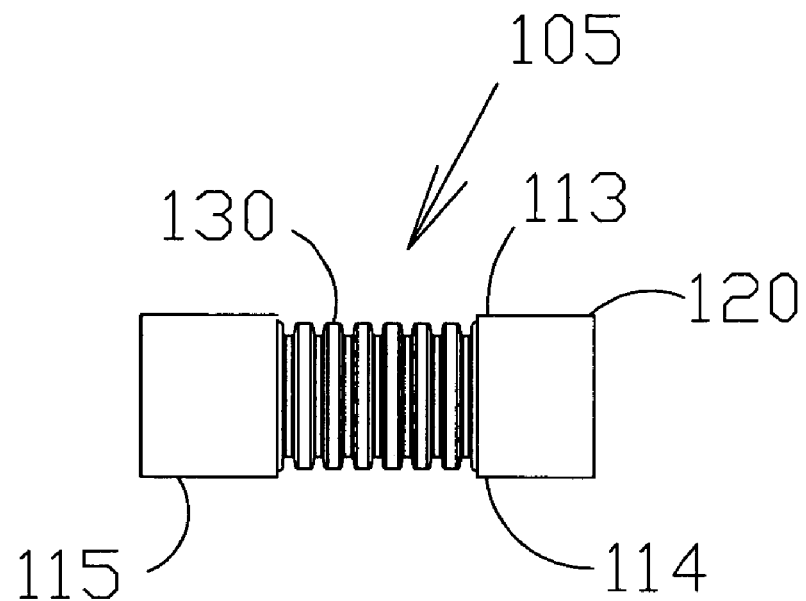
FIG. 7 is a top view of a coupler segment.
Figure 8:
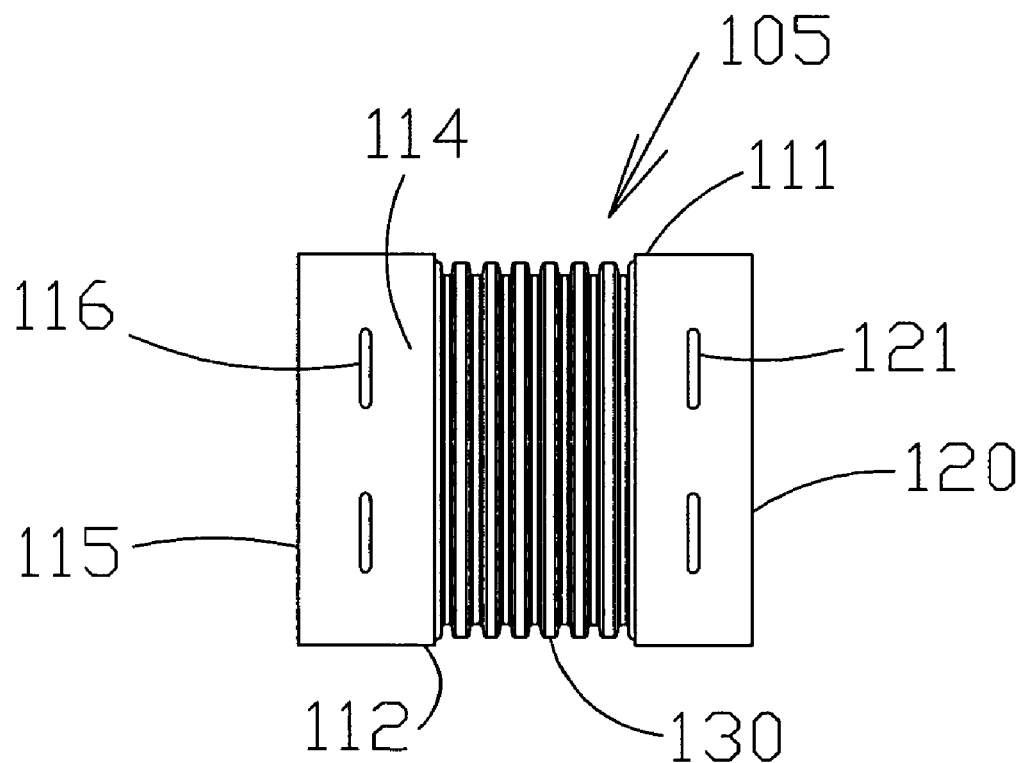
FIG. 8 is a side view of the coupler segment illustrated in FIG. 7.
Figure 9:
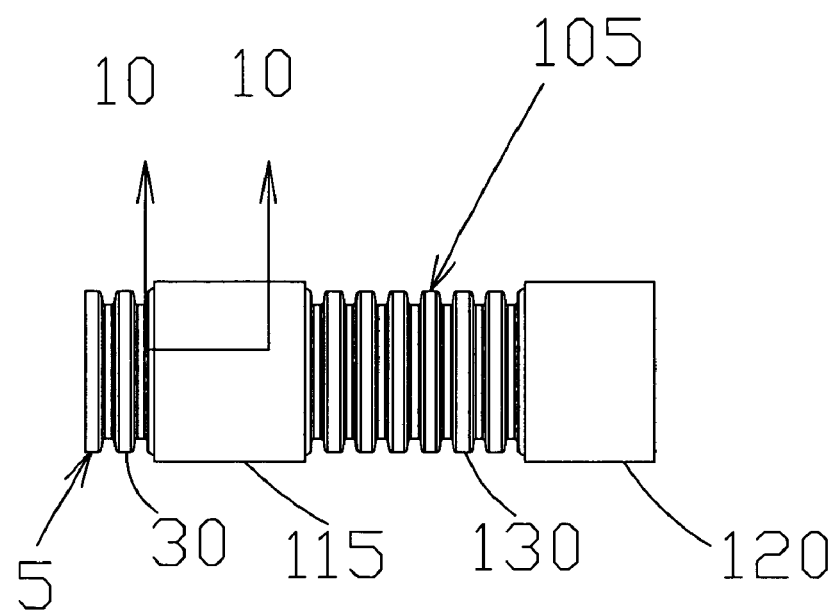
FIG. 9 is a top view of the coupler segment mated to a first end of an adjacent drainage segment.
Figure 10:
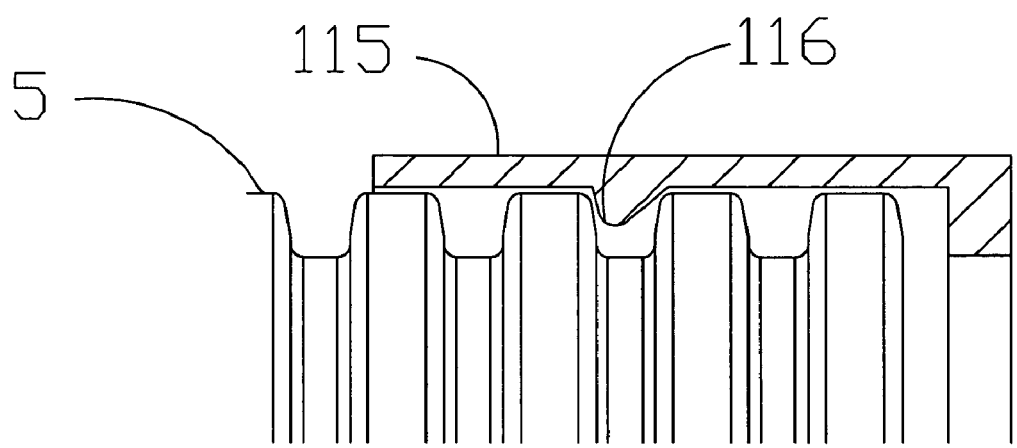
FIG. 10 is a cross-sectional view taken along line 10-10 in FIG. 9.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to FIGS. 1-6, it is seen that a first preferred embodiment of the present invention is illustrated. In the preferred embodiment, the drain segments are constructed of plastic. However, other materials could be used without departing from the broad aspects of the present invention.

Each drain segment 5 is preferably generally straight along a longitudinal axis 6. Segment 5 has a top 11, a bottom 12, sides 13 and 15 respectively, and ends 17 and 18 respectively. Side 13 can have many holes or slots 14 formed there through. Side 15 can also have many holes or slots 16 formed there through. End 17 is described herein as a first end, and end 18 is described as a second end, coupler end, or coupling end. One or more cleats can be at the second end 18. The second end is preferably generally planar, except that the cleats 19 extend from the sides. In the preferred embodiment, there are four cleats 19. However, it is understood that the location and number of cleats could vary without departing from the broad aspects of the present invention. In the illustrated embodiment, the cleats project outwards. However, the cleats may be inwardly projecting without departing from the broad aspects of the present invention.

The segment 5 has an interior 20 and an exterior 25. The drain 5 is preferably corrugated with corrugated segments 30 having alternating crowns or crests 31 and valleys 32. It is preferably that each crown 31 and each valley 32 respectively have similar or identical dimensions for uniformity. Several vertical stiffeners 33 are preferably formed along the top 11 and bottom 12 of the drain 5 within the corrugated segments 30. The vertical stiffeners provide additional stiffness to the drain segment 5. The drain segment 5 can have a plurality of corrugated sections 30 separated by spacers 35, as described below. In the preferred embodiment, the drain segment has a rectangular profile, in such that the top 11 and bottom 12 are respectively parallel and have a linear dimension smaller than the linear dimension of parallel sides 14 and 15. It is understood that other shapes, preferably polygonal in cross-section, will fall within the broad aspects of the present invention.

While each of the top, bottom and sides of the corrugation sections 30 are shown to be corrugated, it is understood that one or more of the top, bottom and sides may be planar without departing from the broadest aspects of the present invention. In this regard, preferred self-coupling features are nevertheless still operable even when only one of the top, bottom and sides are corrugated.

The spacer segments 35 are preferably non-corrugated, and each can have a plurality of horizontal stiffeners 36 on the sides and vertical stiffeners 37 on the top and/or bottom.

A web 40 can be located within the interior 20 of the drain segment 5. The web 40 has a top 41 and bottom 42, each of which preferably being generally parallel to the top 11 of the drain segment. The web further has opposed ends. One end 43 is near the first end and preferably terminates several inches prior to the end of the first end 17 of the drain segment 5. The web preferably extends all the way to the end of the second end 18 of the drain segment 10. The web 40 has sides 45 and 46, which are formed to sides 13 and 15, respectively, of the segment. The web provides structural support to the drain segment 10 by assisting to prevent flexing of the drain segment along the longitudinal axis 6 of the present invention. The web is preferably vertically centered within the interior of the drain 10. However, it is understood that the web 40 may be closer to the top 11 or bottom 12 without departing from the broad aspects of the present invention.

The second end 18 of one segment can be received within the first end 17 of the adjacent segment, as illustrated in FIG. 6. It the regard, the position of cleats 19 is shown wherein they can removably engage crests of the adjacent drain segment. It is also seen how the undercut end 43 of segment 5 provides necessary clearance for end 19 of the adjacent segment to be received within end 17 when the two segments are aligned and removably attached.

It is appreciated that end 17 can be cut to any desired length, without impairing the operability of the present invention.

Turning now to FIGS. 7-10, it is seen that a coupler segment 105 is provided. The coupler segment 105 has a top 111, a bottom 112, sides 113 and 114, an end 115 and an end 120. End 115 is preferably generally flat, and preferably has cleats 116 on each side. End 120 is also preferably generally flat, and preferably has cleats 121 on each side. The portion between ends 115 and 120 is preferably a corrugated portion 130, made of alternating crests and valleys.

Coupler segments 105 can be used to removably connect to two corrugated segments. In this preferred embodiment, the cleats 116 and 120 project inwardly. In this regard, the cleats mate with the adjacent pipe within a valley between two crests to secure the adjacent piece to the coupler segment 105.

Turning now to FIGS. 11-13, it is seen that a T-shaped segment 155 is also provided. Segment 155 has a corrugated body 160, and three ends 165, 170 and 175. Each end 165, 170 and 175, respectively, has cleats 166, 171 and 176. Ends 165 and 170 are preferably linearly opposed, and end 175 is preferably perpendicularly opposed to the other ends.

Figure 15:
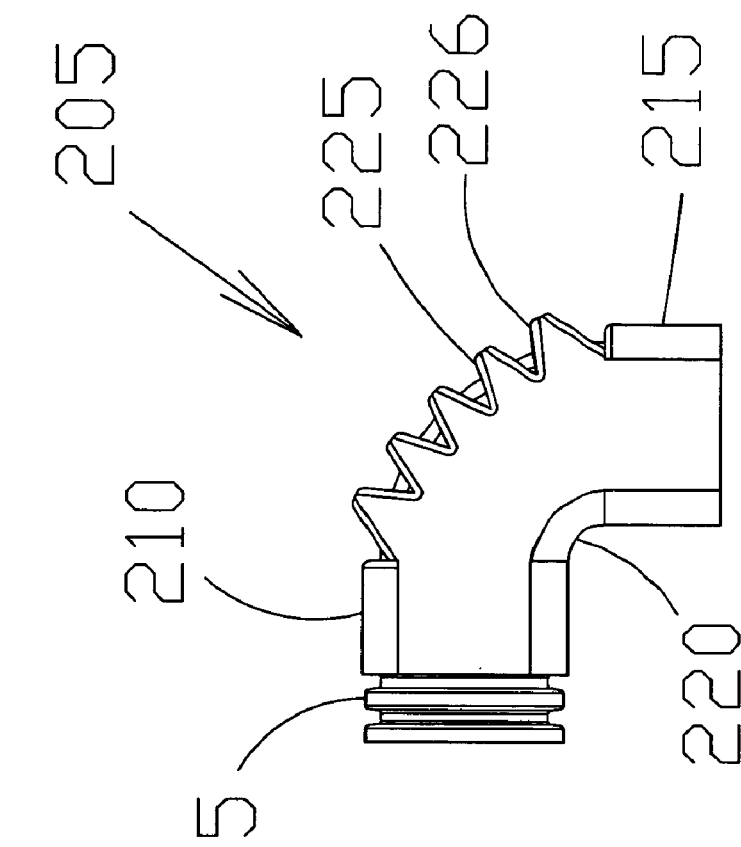
FIG. 15 is a side view of the preferred embodiment illustrated in FIG. 14.
Figure 14:
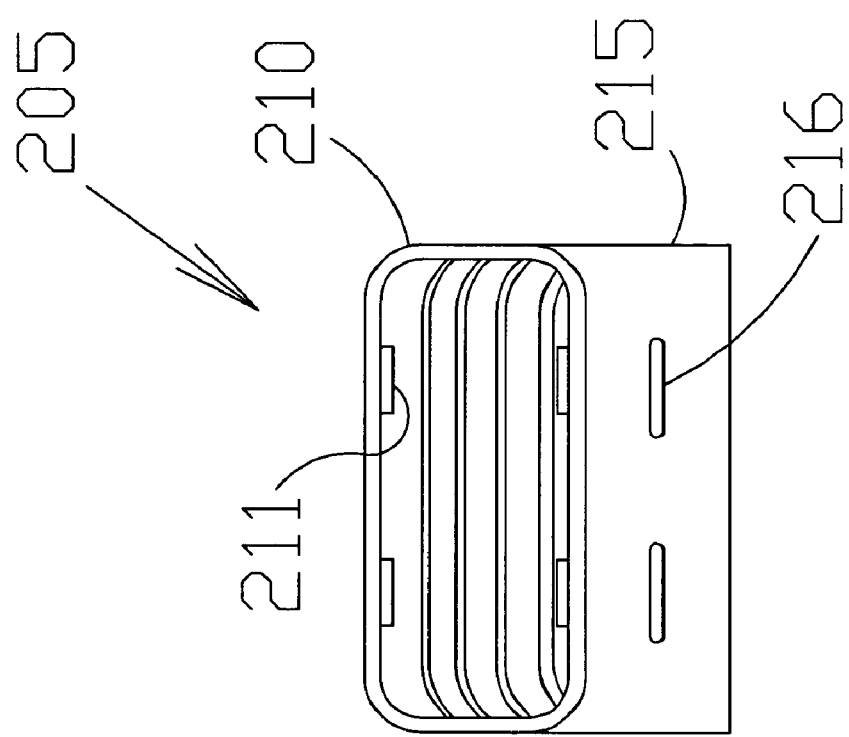
FIG. 14 is an end view of one preferred embodiment of an elbow section.

Turning now to FIGS. 14 and 15, a first preferred embodiment of an elbow is provided. The elbow section 205 has a first end 210 with internally projecting cleats 211. A second end 215, which is preferably perpendicularly disposed from the first end 210 and which also has inwardly projecting cleats 216 is also provided. An inside radius 220 and an outside radius 225 with corrugations 226 is further shown. The elbow segment is designed to slide over the outside of two adjacent drain sections, wherein the cleats can engage the corrugations of the adjacent sections.

Figure 17:
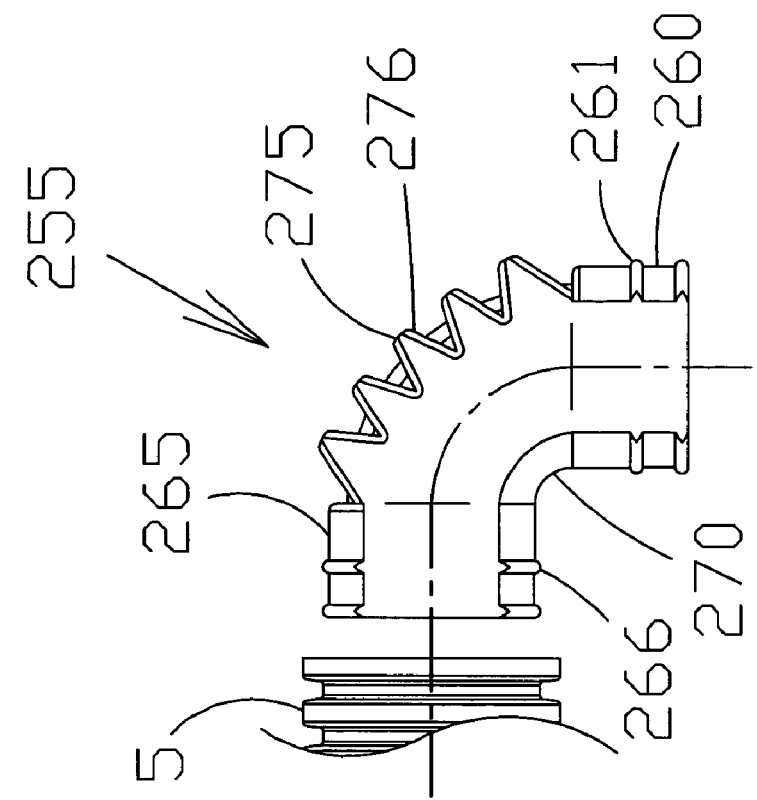
FIG. 17 is a side view of the preferred embodiment illustrated in FIG. 16
Figure 16:
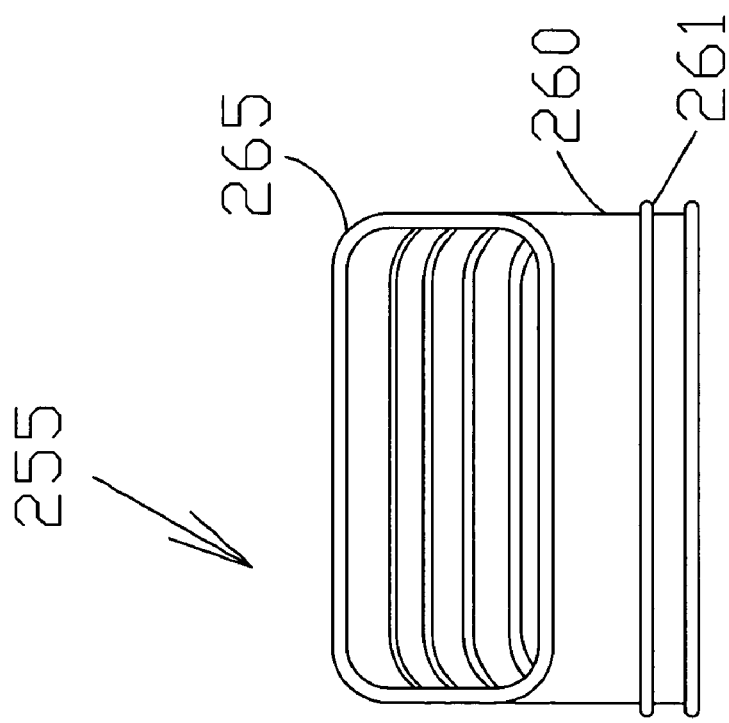
FIG. 16 is an end view of an alternative preferred embodiment of an elbow section.

Turning now to FIGS. 16 and 17, a second preferred embodiment of an elbow is provided. The elbow section 255 has a first end 260 with outwardly projecting ribs 261. A second end 265, which is preferably perpendicularly disposed from the first end 260 and which also has outwardly projecting ribs 266 is also provided. An inside radius 270 and an outside radius 275 with corrugations 276 is further shown. The elbow segment is designed to receive corrugated ends of two adjacent drain sections, wherein the ribs can engage the corrugations of the adjacent sections.

It is appreciated that braces may be utilized to maintain spacing between two parallel segments. The braces (not shown) can have several shapes, and can be securely positioned within a selected valley between two crowns in the opposed segments to provide spacing, not interfere with a striking surface, and maintain longitudinal spacing.

Thus it is apparent that there has been provided, in accordance with the invention, corrugated foundation drain that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A drain pipe comprising:
a top;
a bottom;
a first side; and
a second side;
wherein said top, said bottom, said first side and said second side define a generally polygonal structure; and
wherein said structure comprises a first corrugated section and a second corrugated section, said second corrugated section and said first corrugated section being separated by a spacer section, wherein said spacer section is non-corrugated.

2. The drain pipe of claim 1 further comprising:
a first end having a coupler; and
a second end,
wherein said coupler mates with a portion of a corrugation section of an adjacent pipe.

3. The drain pipe of claim 2 wherein said coupler comprises at least one cleat.

4. The drain pipe of claim 3 wherein:
said first end comprises generally planar first end top, first end bottom, first end first side and first end second side;
said at least one cleat perpendicularly extends from said first end; and
said cleat is adapted to engage one of:
one of said plurality of crests of an adjacent pipe; and
one of said plurality of valleys of an adjacent pipe.

5. The drain pipe of claim 1 further comprising a web, said web extending between said first side and said second side.

6. The drain pipe of claim 5 wherein said web is generally planar, and generally parallel to said top and said bottom.

7. The drain pipe of claim 6 wherein said web is undercut at one of said first end and said second end.

8. The drain pipe of claim 1 wherein:
said first end is non-corrugated, and
said second end terminates within one of said plurality of corrugated sections.

9. The drain pipe of claim 1 wherein said spacer section comprises at least one horizontal support.

10. The drain pipe of claim 9 wherein said at least one horizontal support comprises a plurality of horizontal supports, each of said plurality of horizontal supports being generally linear.

11. The drain pipe of claim 1 further comprising at least one vertical support.

12. A modular drain pipe comprising:
a first end, said first end being non-corrugated and comprising a coupler adapted to mate with a corrugated segment of an adjacent pipe;
a second end, said second end being corrugated with a plurality of corrugations, said plurality of corrugations defining a corrugation height as the height between a crest and a valley; and
a plurality of corrugation sections intermediately spaced with a spacer section, said spacer section being non-corrugated.

13. The modular drain pipe of claim 12 wherein said coupler comprises at least one cleat, said cleat extending from said second first end a height less than said corrugation height.

14. The modular drain pipe of claim 12 further comprising:
a top;
a bottom generally parallel with said top;
a first side;
a second side opposed to said first side; and
an internal membrane between said first side and said second side; said internal membrane being generally parallel to said top and said bottom.

15. A drain pipe comprising:
a top;
a bottom;
a first side; and
a second side; and
a web,
wherein:
said web spans between said first side and said second side; and
said drain pipe comprises at least one corrugated section having plurality of crests and a plurality of valleys.

16. The drain pipe of claim 15 further comprising:
a first end having a coupler therein; and
a second end.

17. The drain pipe of claim 1 wherein said web extends to said first end, and is undercut at said second end.

18. The drain pipe of claim 15 further comprising at least one vertical support extending to at least two consecutive crests in said at least one corrugated section.

* * * * *